US010275922B2

(12) United States Patent
Pan et al.

(10) Patent No.: US 10,275,922 B2
(45) Date of Patent: Apr. 30, 2019

(54) METHOD FOR SKINNING TECHNOLOGY BASED ON EXTENDED POSITION BASED DYNAMICS AND FOR WEIGHT RETARGETING IN CHARACTER ANIMATION

(71) Applicant: BEIHANG UNIVERSITY, Beijing (CN)

(72) Inventors: Junjun Pan, Beijing (CN); Lijuan Chen, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 16 days.

(21) Appl. No.: 15/711,954

(22) Filed: Sep. 21, 2017

(65) Prior Publication Data

US 2018/0182152 A1 Jun. 28, 2018

(30) Foreign Application Priority Data

Dec. 26, 2016 (CN) .......................... 2016 1 1221233

(51) Int. Cl.
*G06T 13/40* (2011.01)
*G06T 17/20* (2006.01)

(52) U.S. Cl.
CPC ............ *G06T 13/40* (2013.01); *G06T 17/205* (2013.01); *G06T 2210/21* (2013.01)

(58) Field of Classification Search
CPC ..... G06F 17/5018; G06T 17/20; G06T 17/00; G06T 13/20; G06T 13/40; G06T 19/00; G06T 19/20

(Continued)

(56) References Cited

U.S. PATENT DOCUMENTS

2008/0297516 A1* 12/2008 Smith ................... G06T 13/20
345/473
2008/0316202 A1* 12/2008 Zhou ..................... G06T 17/20
345/419

(Continued)

OTHER PUBLICATIONS

Sumner, Robert W., and Jovan Popovic. "Deformation transfer for triangle meshes." ACM Transactions on Graphics [TOG] 23, No. 3 (2004): 399-05.*

(Continued)

*Primary Examiner* — Thomas J Lett
(74) *Attorney, Agent, or Firm* — J.C. Patents

(57) ABSTRACT

Disclosed relates to a method for skinning technology based on extended PBD and for weight retargeting in character animation. A corresponding tetrahedral mesh is generated for a given triangular mesh; a tensile constraint, a volume constraint, a self-collision constraint and an energy constraint of the extended PBD are initialized for the tetrahedral mesh, and vertex weights of the triangular mesh and the tetrahedral mesh are optimized simultaneously; the deformations of the triangular and the tetrahedral meshes are implemented through LBS technique; deformation results of the LBS are optimized through extended PBD; the joint region of the triangular mesh is smoothed through a Laplacian smoothing; bi-harmonic distance fields of the original mesh and a new mesh are calculated respectively, and two corresponding vertices of the mesh are given and a prediction function is defined; A weight retargeting algorithm is implemented in the present application and has a good practicability.

5 Claims, 9 Drawing Sheets

(58) Field of Classification Search
USPC .......................................................... 345/473
See application file for complete search history.

(56) References Cited

U.S. PATENT DOCUMENTS

| | | | |
|---|---|---|---|
| 2010/0033488 A1* | 2/2010 | Zhou ........................ | G06T 13/40 345/473 |
| 2014/0002463 A1* | 1/2014 | Kautzman ................ | G06T 13/40 345/473 |
| 2015/0178988 A1* | 6/2015 | Montserrat Mora ... | G06T 13/40 345/420 |
| 2017/0032055 A1* | 2/2017 | Eisemann ................ | G06F 17/10 |
| 2017/0032560 A1* | 2/2017 | Dionne .................... | G06T 13/40 |

OTHER PUBLICATIONS

Chen, Cheng-Hao, I-Chen Lin, Ming-Han Tsai, and Pin-Hua Lu. "Lattice-based skinning and deformation for real-time skeleton-driven animation." In Computer-Aided Design and Computer Graphics (CAD/Graphics), 2011 12th ntemational Conference on, pp. 306-312. IEEE, 2011.*

Vaillant, Rodolphe, Loic Barthe, Gael Guennebaud, Marie-Paule Cani, Damien Rohmer, Brian Wyvill, Olivier Gourmel, and Mathias Paulin. "Implicit skinning: real-time skin deformation with contact modeling." ACM Transactions on Graphics (TOG) 32, No. 4 (2013): 125.*

* cited by examiner (a) (b) (c)

METHOD FOR SKINNING TECHNOLOGY BASED ON EXTENDED POSITION BASED DYNAMICS AND FOR WEIGHT RETARGETING IN CHARACTER ANIMATION

CROSS-REFERENCE TO RELATED APPLICATION

This application claims priority to Chinese Patent Application No. 201611221233.X, filed on Dec. 26, 2016, which is hereby incorporated by reference in its entirety.

TECHNICAL FIELD

The present application relates to a method for skinning technology based on extended position based dynamics and for weight retargeting in character animation.

BACKGROUND

Character animation is becoming an indispensable part of human life. With the development of computer animation, people could no longer be satisfied with the experience brought from a poor deformation effect and an unreal performance of an animation character, and then the topic of how to achieve the real and natural performance effect of the three-dimensional character animation has attracted extensive attention in the field of academia and industry.

The implementation process of the character animation contains two important tasks: embedding a given skeleton and skinning. As time goes through, people's research on character animation is deepening, and many technologies about skeleton binding and skinning have been put forward. However, none of them is perfect, and one technology that, on one hand, has one advantage has a disadvantage on the other hand. All along, people have tried to find out better and robuster algorithms at every stage of the whole process of the character animation, so as to achieve a more satisfying visual effect in shortest possible computing time.

In this context, the most classical LBS (linear blend skinning) of the skinning technology in the process of achieving the character animation is firstly improved in the present application. Due to some non-negligible "birth defects" of the technology, for example, the phenomenon of collapse and wrapper distortion occurring at joint parts during deformation, the PBD (position based dynamics) method is used to optimize the skinning results in the present application, where the key optimized content is the joint parts of the character model. In addition, the quality of the skinning effect is determined by the skin weight in the LBS, while the calculation of weight is usually a very time-consuming process where the single Weight Painting result is often disappointing and needs to be modified repeatedly. Therefore, another key point of the present application is to achieve the weight retargeting, i.e., how to make an animation model that has been optimized in weight obtain the weight thereof in a way of knowledge obtaining, and relocate it to a new model, which can save a lot of time and labor from animators. The present application is of great significance in realizing a more real and natural three-dimensional character animation and reducing manual operation and time to be consumed in the animation realization process.

SUMMARY

The technical problem solved in the present application is how to provide a skinning method based on extended PBD in view of the problems that the traditional LBS method in the character animation is fast but the effect is not real enough. In addition, aiming at the time-consuming problem of artificial optimization of vertex weights of the mesh in the animation process, the algorithm for weight retargeting which reduces the time required in the whole animation pipeline is also provided.

A skinning method, which utilizes a position based dynamics method to optimize the linear blend skinning technology in the character animation, and also a weight retargeting algorithm are implemented in the present application, which have a good practicability.

The technical solution employed in the present application is the skinning technology based on the extended position based dynamics in character animation and the weight retargeting method, the steps are as follows:

step (1), generating a tetrahedral mesh corresponding to a triangular mesh according to an input triangular mesh, initializing a tensile constraint, a volume constraint, a self-collision constraint and an energy constraint of an extended position based dynamics (PBD) for the tetrahedral mesh, and calculating and optimizing vertex weights of the triangular mesh and the tetrahedral mesh according to a corresponding skeleton model;

step (2), according to the vertex weight obtained in step (1), simultaneously calculating transformed vertex positions of the triangular mesh and the tetrahedral mesh by using LBS in the process of skeletal movement, to implement deformations of the both;

step (3), calculating the transformed vertex positions of the tetrahedral mesh through a constraint on the PBD defined by the iterative solution, and updating a deformation effect of the triangular mesh through a mapping relation between the tetrahedral mesh and the triangular mesh;

step (4), conducting a Laplacian smoothing on a joint region of the triangular mesh, the deformation effect of which is updated currently in step (3), and obtaining a real and natural triangular mesh deformation effect;

step (5), taking the triangular mesh in step (1) as an original mesh, giving another triangular mesh which is similar to the mesh topology as a new mesh, calculating a bi-harmonic distance field of the original mesh and the new mesh respectively, selecting a set of corresponding reference vertices between the original mesh and the new mesh, re-expressing all vertices on the original mesh in a form of distance vectors associated with the vertices selected as the reference vertices on the original mesh, and defining a prediction function for weight retargeting calculation;

step (6), according to the bi-harmonic distance field obtained in step (5), as for any vertex on a new mesh, obtaining, by minimizing the prediction function, a corresponding vertex on the original mesh to complete the retargeting of the vertex weight from the original mesh to the new mesh. In order to reduce the errors of the algorithm, multiple corresponding vertices are acquired for each vertex on the new mesh in the present application, and then a final weight is obtained through an interpolation method. On the premise that calculation is reduced and a smallest possible error is ensured, the number of corresponding vertices to be acquired in the present application is five.

In the step (1), initializing the stretching constraint, the volume constraint, the self-collision constraint and the energy constraint of the extended position based dynamics (PBD) model is specifically:

an energy constraint is defined for each small tetrahedral element in the tetrahedral mesh, let $P_0$ be a center of gravity of the tetrahedral $P_1P_2P_3P_4$, then the formula is:

$$P_0 = \Sigma_{i=1}^{4} m_i P_i / \Sigma_{i=1}^{4} m_i \quad (1)$$

according to Hooke's law, the energy constraint is defined as:

$$C_{energy}(P_1,P_2,P_3,P_4)=\tfrac{1}{2}\Sigma_{i=1}^{4}k_i(|P_i-P_0|-d_i)^2 \qquad (2)$$

where $k_i$ is an elastic coefficient of the virtual spring $P_iP_0$, and $d_i$ is a static length of the spring;

when the volume loss, due to the large deformation of the mesh resulted from an increase in the energy constraint, is too large, the body holdability of the position based dynamics method can be further improved thus the deformation effect of the mesh is more realistic.

In the step (2), an extended PBD optimization mesh deformation is as follows:

at the skinning stage, the deformations of the triangular mesh and the tetrahedral mesh are firstly implemented through the LBS, and a formula for the position transformation of a vertex on the mesh is as follows:

$$P'=\Sigma_{i=1}^{b} w_i B_i^{-1} W_i P \qquad (3)$$

where b is the number of skeleton blocks, $w_i$ is an influence weight of the ith block of the skeleton on the vertex, and $\Sigma_{i=1}^{b} w_i=1$, B is a constant, $W_i$ is a world matrix of the ith block of the skeleton;

the barycentric coordinates is utilized to implement a mapping between the triangular mesh and the tetrahedral mesh, the formula for the relation between each vertex P of the triangular mesh and four vertices $P_1$, $P_2$, $P_3$, and $P_4$ of the corresponding tetrahedral mesh is as follows:

$$P=\Sigma_{i=1}^{4} P_i w_i \qquad (4)$$

where $w_i$ is a weight of vertex P corresponding to $P_i$;

through the optimization of the deformation effect of the LBS by the extended PBD, the volume loss caused by the mesh deformation is controlled in an expected range, and the problem of the mesh self-intersection is eliminated.

In the step (5), the procedure of calculating the bi-harmonic distance field of the mesh is:

the first step, calculating the bi-harmonic distance fields of the new mesh M and the original mesh N respectively;

the second step, giving a set of corresponding vertices $(x_i, y_i) \in M \times N$, i=1, ..., k, where k is the number of pairs of corresponding vertices;

the third step, representing any vertex $x \in M$ in distance vectors to known corresponding vertices:

$$\overline{X} = \frac{1}{\max_i d(x, x_i)}(d(x, x_1), d(x, x_2), ..., d(x, x_k)) \qquad (5)$$

accordingly, also representing any vertex $y \in N$ in:

$$\overline{Y} = \frac{1}{\max_i d(y, y_i)}(d(y, y_1), d(y, y_2), ..., d(y, y_k)) \qquad (6)$$

the fourth step, defining a predictive function:

$$C(x,y)=|\overline{X}-\overline{Y}|_w=(\Sigma_{i=1}^{k} w_i(x)|d(x,x_i)-d(y,y_i)|^2)^{1/2} \qquad (7)$$

for the given x, the y which lets the prediction function have the minimum value is x', which is the corresponding vertex of x, in order to reduce the errors, it is necessary to find another four vertices $y_1$, $y_2$, $y_3$, and $y_4$ for x that make the prediction function value be relatively minimum, and obtain a final weight of x through the interpolation method:

$$w_{x'} = \frac{\sum_{i=1}^{4} f_i(x') w_i}{\sum_{i=1}^{4} f_i(x')} \qquad (8)$$

where w is a weight vector, $$f_i(x') = \frac{1}{d(y_i, x')}, d(.,.)$$

is a bi-harmonic distance between two vertices.

The implementation of the weight retargeting algorithm shows a new way to obtain the mesh weight, which avoids the time-consuming manual operation, and omits the process of optimizing the weight in the step (1).

The principle of the present application is that:

(1) the traditional LBS technology is simple and fast, while an inevitable and obvious defect exists in the deformation effect due to the algorithm itself, and the results thereof is optimized by using the extended PBD method in the present application to keep the speed advantage in the first stage of the skinning, and correct the defects in the first stage of the skinning, and then a better balance between the efficiency and effectiveness is achieved in the entire algorithm.

(2) the position based dynamics method applied in mesh deformation has an advantage of good body holdability, and by using the mapping relation between the tetrahedral mesh and the triangular mesh and updating the vertex positions of the tetrahedral mesh, the vertex positions of the triangular mesh are updated indirectly and the purpose of body holdability in the process of the triangular mesh deformation is achieved. Moreover, the extension of the traditional position based dynamics method further strengthens the advantage of the body holdability.

(3) for the mesh weight automatically calculated, it may require a lot of manpower for the amendment to small details, which not only increases the demand for time, but also cannot guarantee the correctness of the results. The automatic weight retargeting method can reduce the time required in the weight calculation, thus reducing the time required in the entire algorithm and improving efficiency.

(4) the weight retargeting algorithm changes the traditional method of obtaining the weights of the mesh vertices, obtains the vertices in the original mesh corresponding to the vertexes of the new mesh through mesh matching, and employs the method for finding five corresponding vertices for each vertex and obtaining the weight thereof through interpolation, which ensures the correctness of the weight retargeting results and has good globality and robustness.

The present application has the following advantages over the prior art:

(1) the extended PBD model provided in the present application can increase the energy constraint on the basis of the original method, and can better implement the body holdability in the triangular mesh deformation.

(2) the present application employs the bi-harmonic distance as the basis of the weight retargeting method, which has the advantages such as good globality to make the weight retargeting method feasible.

DESCRIPTION OF EMBODIMENTS

Figure 1:
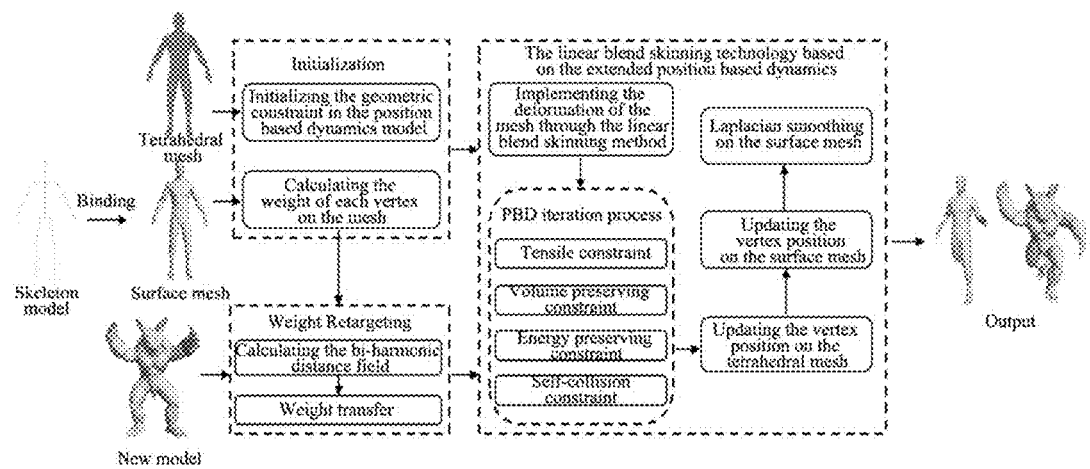
FIG. 1 is a flow diagram of the method process of the present application.

FIG. 1 shows a flow diagram of the process of the method for skinning technology based on the extended position based dynamics and for weight retargeting in character animation, and the present application will be further illustrated with reference to the accompanying drawings and specific embodiments.

The present application provides a method for skinning technology based on the extended position based dynamics and for weight retargeting in character animation, and the main steps are as follows:

1. The Initialization of the Mesh

Figure 2:
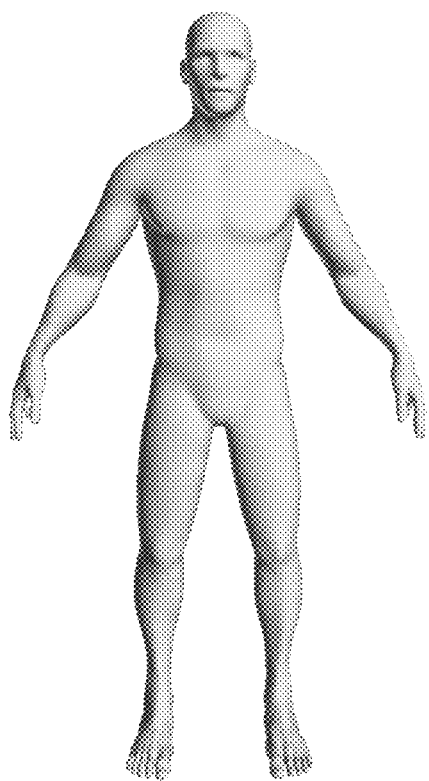
FIG. 2 is a schematic diagram of the input surface mesh.
Figure 3:
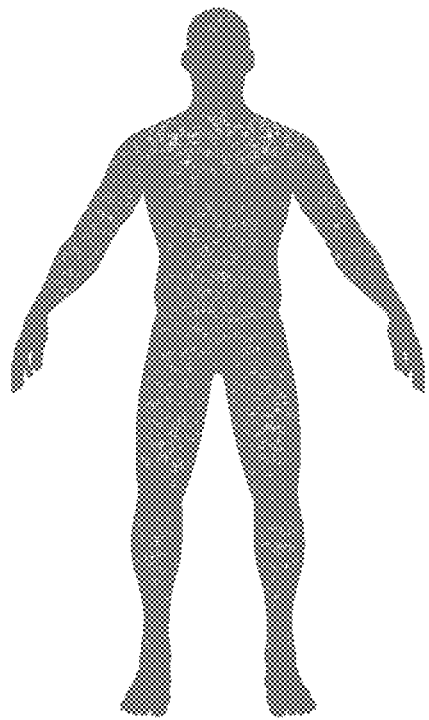
FIG. 3 is a schematic diagram of the tetrahedral mesh generated based on the surface mesh.
Figure 4:
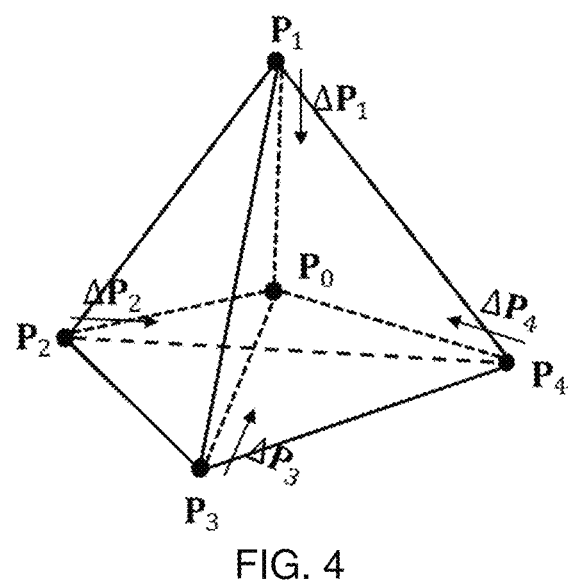
FIG. 4 is a schematic diagram of the energy constraints.

The corresponding tetrahedral mesh is generated by the method according to the input triangular mesh, the definition of various constraints in the tetrahedral mesh is completed and the weights of the vertices in the triangular mesh and the tetrahedral mesh are calculated. The initial input is a triangular mesh file which is stored in the obj format, as shown in FIG. 2. For the triangular mesh, the corresponding tetrahedral mesh is generated utilizing the software PhysXViewer, as shown in FIG. 3. In addition to the conventional tensile constraint, the volume constraint, and the collision constraint defined for the tetrahedral mesh, an energy constraint is further defined for each of the tetrahedral elements, as shown in FIG. 4. Let $P_0$ be the center of gravity of the tetrahedral $P_1P_2P_3P_4$, then there is:

$$P_0 = \Sigma_{i=1}^{4} m_i P_i / \Sigma_{i=1}^{4} m_i \quad (1)$$

where $m_i$ is the mass of the ith vertex and is 1 in the present application.

According to Hooke's law, the energy constraint is defined as:

$$C_{energy}(P_1,P_2,P_3,P_4) = \frac{1}{2}\Sigma_{i=1}^{4} k_i(|P_i - P_0| - d_i)^2 \quad (2)$$

where $k_i$ is an elastic coefficient of the virtual spring $P_iP_0$, and different values of k have different effects on the effect of the experiment, and in the present application, $k_i$ has a same value of 0.2. $d_i$ is a static length of the spring.

The distance method is employed to calculate the weight of the mesh vertices based on the skeletons. Firstly, the mesh is separated into several sub-meshes corresponding to the each of the skeletons, and a formula for vertex $P_i$ relative to skeletons $b_j$ is calculated as:

$$w_{i,j} = \frac{\left(\frac{1}{d_{i,j}}\right)^4}{\sum_{k=1}^{n_i} \left(\frac{1}{d_{i,j}}\right)^4} \quad (3)$$

Where $d_{i,j}$ is a distance from $P_i$ to skeleton $b_j$, and $n_i$ is the number of the skeletons associated with vertex $P_i$.

2. The LBS Based on the Extended PBD

Figure 5:
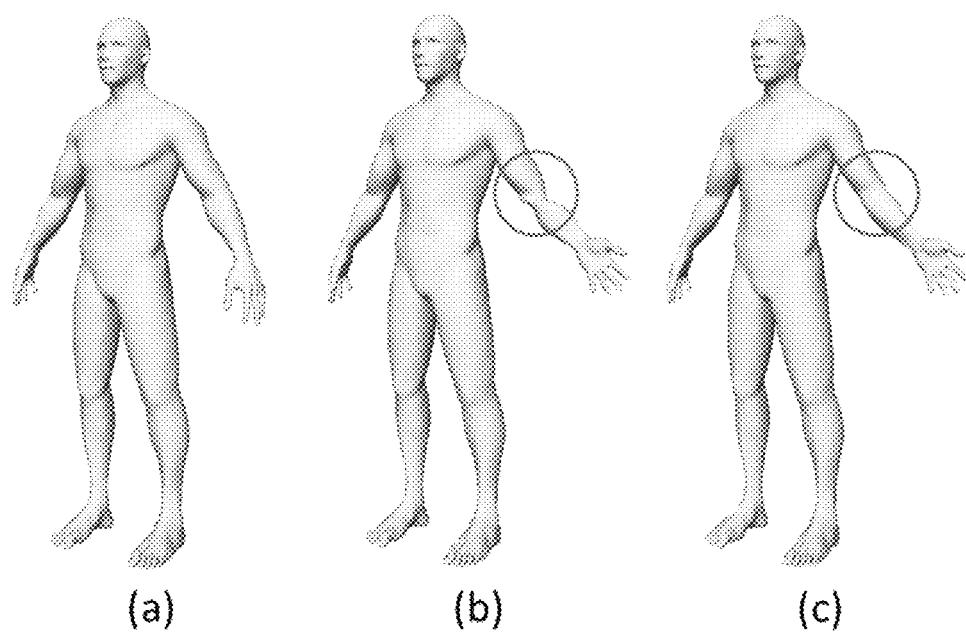
FIG. 5 is a schematic diagram of the LBS process based on extended PBD.

The LBS technology is utilized to implement the deformations of triangular mesh and tetrahedral mesh in the first stage of the mesh deformation, and the extended PBD method is utilized to optimize the triangular mesh deformation in the second stage. As shown in FIG. 5, there are provided two stages of the skinning technology in the present application. (a) is the initial state of the input mesh, and (b) is obtained after the lower part of the left hand rotates around the elbow joint by 150 degrees and the use of LBS deformation. As shown in part of the circle, the mesh is distorted and the volume loss is large, and then the extended PBD is utilized to further deform and optimize the triangular mesh to obtain graph (c).

(1) The linear blend skinning algorithm: the linear blend skinning algorithm is used to update the vertex positions of the mesh through the matrix transformation. The formula is:

$$P' = \Sigma_{i=1}^{b} w_i B_i^{-1} W_i P \quad (4)$$

where b is the number of the skeleton blocks, $w_i$ is a weight of influence the ith block of the skeleton on the vertex, and $\Sigma_{i=1}^{b} w_i = 1$. B is a binding matrix of the skeletons and is a constant, and $W_i$ is a world matrix of the ith block of the skeleton.

In the process of the skeletal movement, the vertex positions are updated utilizing the LBS technique simultaneously for the triangular and tetrahedral meshes.

(2) Extended PBD to optimize the effect of the triangular mesh deformation: the vertex positions of the tetrahedron mesh are updated through all constraints of the tetrahedron mesh defined by the iterative solution, and then the vertex positions of the triangular mesh are updated utilizing a mapping relation between the triangular mesh and the tetrahedral mesh, and the formula is:

$$P = \Sigma_{i=1}^{4} P_i w_i \quad (5)$$

where $w_i$ is a weight of vertex P corresponding to $P_i$.

In order to further improve the results of the triangular mesh deformation, the Laplacian smoothing is used to smooth the joint region of the mesh, and the formula is:

$$P_i' = (1-k_i)P_i + k_i \tilde{P}_1 \quad (6)$$

where $\tilde{P}_1$ is a center point of the ring field of the vertex $P_i$, and $k_i$ is a smooth intensity. After the smoothing, the result of the triangular mesh deformation substantially achieves the desired effect. As shown in FIG. 5 (c), the deformation of circle part is real and natural, and the volume loss caused by the mesh deformation is controlled in an invisible range.

3. The Weight Retargeting

The deformation effect of the LBS largely depends on the calculation results of the vertex weights of the mesh, in order to reduce the demand of time and manpower from the weight calculation, an algorithm for weight retargeting is provided in the present application.

Figure 6:
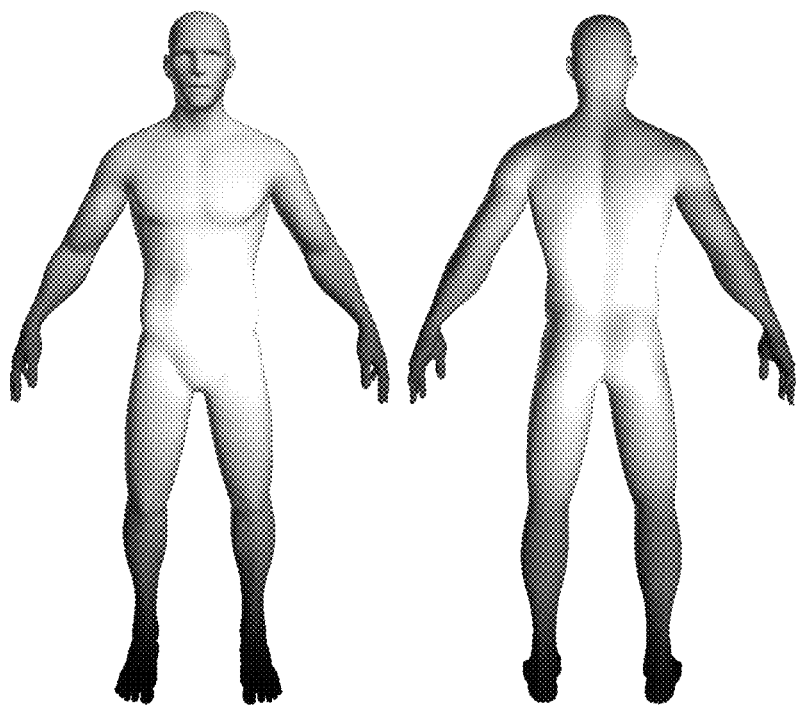
FIG. 6 is a schematic diagram of the bi-harmonic distance field of the single source point.

The bi-harmonic distance field is employed in the present application to calculate the bi-harmonic distance between any two vertices on the mesh, the mesh matching is implemented by minimizing the prediction function to complete the weight retargeting; in particular:

step 1, calculating the bi-harmonic distance fields of the new mesh M and the original mesh N respectively. The front and the back schematic diagrams of the bi-harmonic distance field of the given single source point are shown in FIG. 6, where the source point is at the navel, the whiter point indicates a shorter distance from the source, and the darker point indicates a longer distance from the source;

step 2, giving a set of corresponding vertices $(x_i, y_i) \in M \times N$, $i=1, \ldots, k$, where k is the number of the pairs of the corresponding vertices;

step 3, representing any vertex $x \in M$ in distance vectors to a known corresponding vertex:

$$\overline{X} = \frac{1}{\max_i d(x, x_i)}(d(x, , x_1), d(x, , x_2), \ldots, d(x, , x_k)) \quad (7)$$

accordingly, also representing any vertex $y \in N$ in:

$$\overline{Y} = \frac{1}{\max_i d(y, y_i)}(d(y, , y_1), , d(y, , y_2), \ldots, d(y, , y_k)) \quad (8)$$

step 4, defining the prediction function:

$$C(x,y) = |\overline{X} - \overline{Y}|_w = (\Sigma_{i=1}^k w_i(x) |d(x,x_i) - d(y,y_i)|^2)^{1/2} \quad (9)$$

for the given x, the y which lets the prediction function have the minimum value is x', which is the corresponding vertex of x. In order to reduce errors, it is necessary to find another four vertices $y_1$, $y_2$, $y_3$, and $y_4$ for x that make the prediction function value be relatively minimum, and obtain a final weight of the x through the interpolation method:

$$w_{x'} = \frac{\sum_{i=1}^4 f_i(x') w_i}{\sum_{i=1}^4 f_i(x')} \quad (10)$$

where w is a weight vector, $d(. , .)$ in $$f_i(x') = \frac{1}{d(y_i, x')}$$

is the same as those in formulas (7), (8) and (9), which is the bi-harmonic distance between two vertices.

Figure 7:
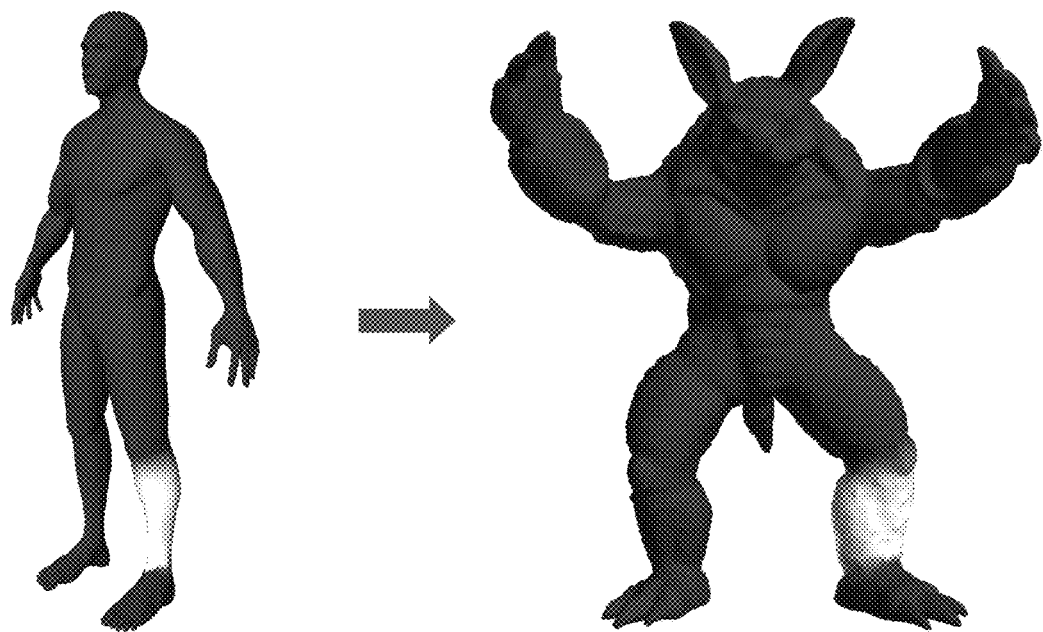
FIG. 7 is a schematic diagram of the results of the weight retargeting.

As shown in the left figure in FIG. 7, the hoary part of the calf of the human body model represents the influence range of the calf bone, the depth of the color represents the magnitude of the influence degree, and the model weight is relocated into the pangolin model to achieve the effect in the right figure of FIG. 7, where the influence range of the corresponding calf bone and the influence degrees on different vertices are similar to those of the left human body model, which illustrates the correctness of the weight transfer algorithm.

The equipment used in the experiment are an NVIDIA GeForce GTX 630, an Intel® Core™ i7-4790CPU (3.60 GHz, 8 cores) and a 8 GB RAM= that are running on a Windows 7 64-bit system.

Figure 8:
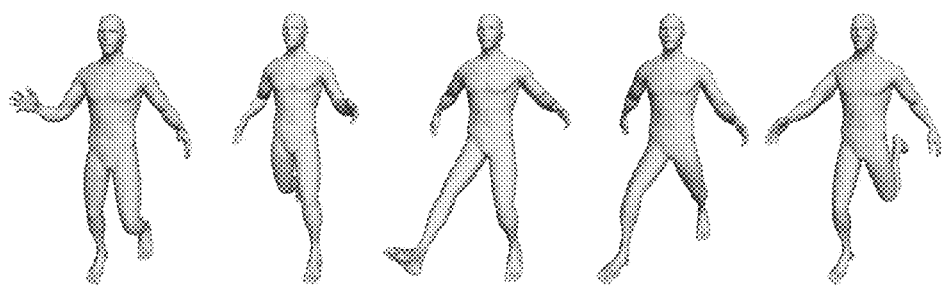
FIG. 8 is a schematic diagram of the skinning effect of the human body model.
Figure 9:
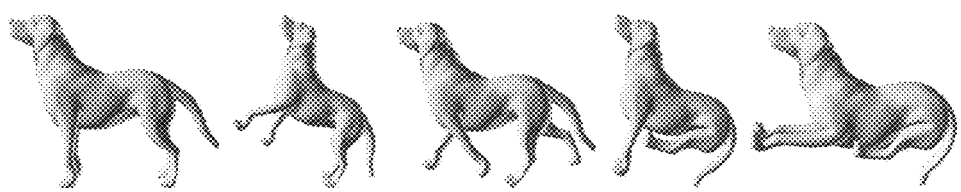
FIG. 9 is a schematic diagram of the skinning effect of the dog model.
Figure 10:
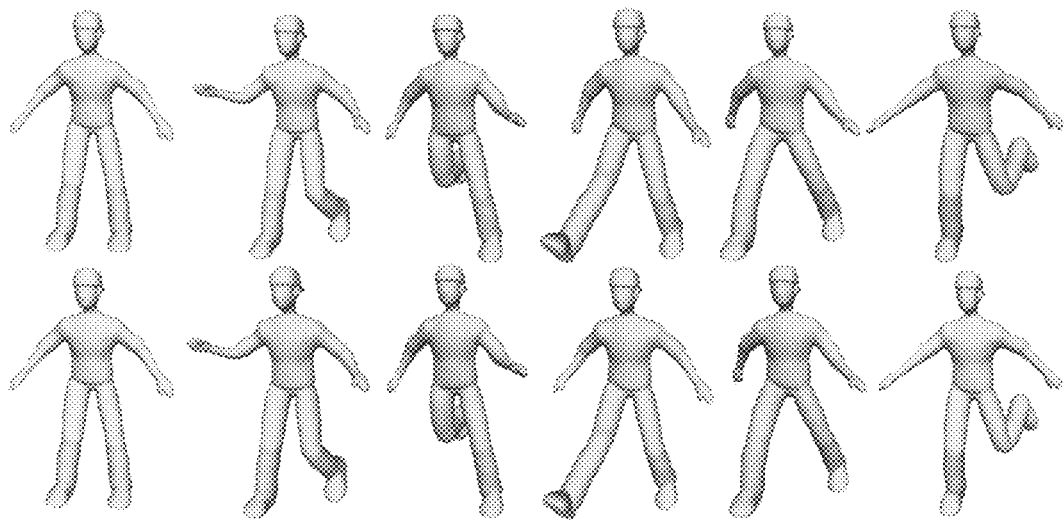
FIG. 10 is a schematic contrast diagram of the skinning effect of the weight retargeting based on the doll model.
Figure 11:
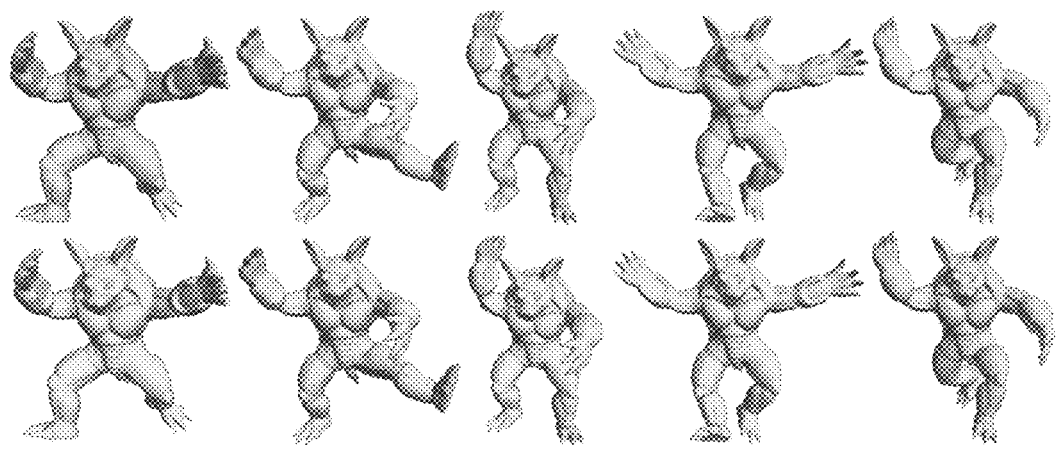
FIG. 11 is a schematic contrast diagram of the skinning effect of the weight retargeting based on a pangolin model.

There are four experimental models: a human body, a dog, a doll and a pangolin. The performance of the experiment is shown as Table 1. FIG. 8 and FIG. 9 are the effect diagrams of the skinning experiment, where deformations are respectively conducted on the human body model and the dog model using the skinning technology based on the extended PBD to achieve the deformation results of five different postures, and it can be seen that, for different types of objects, the skinning algorithm can achieve more realistic and natural deformation effects, and has good robustness. FIG. 10 and FIG. 11 are the effect diagrams and are obtained by relocating the weights of human body model to the doll and pangolin model respectively, and applying the relocated weights to the LBS deformation which is based on extended PBD. For each figure, the weights used in the above deformation effect are obtained from the calculation using the distance method, and the weights used in the following deformation effects are obtained through the retargeting of the human body model and the effects of the both are equivalent as for the same posture.

TABLE 1

Performance of different models

|  | Number of Vertices | Number of Tetrahedrons | Running time/ms |
| --- | --- | --- | --- |
| Human body | 24461 | 51110 | 56.4 |
| Dog | 18114 | 30790 | 39.0 |
| Doll | 13336 | 25768 | 38.8 |
| Pangolin | 15116 | 23916 | 37.6 |

In Table 1, the running time is the time during which the entire procedure from the input of the model to the output of the deformation results runs. As we can see from the table, the more the vertices in the model are, the more tetrahedral elements of the corresponding tetrahedral mesh, the more constraints to be solved in the PBD iteration process and the longer running time in the whole process there will be.

In conclusion, a skinning method which optimizes the linear blend skinning technology utilizing the extended position based dynamics method and an algorithm for weight retargeting are implemented in the present application, and have good practicability.

The technical content not described in detail in the present application belongs to the common general technology for those skilled in the art.

Although the illustrative specific embodiments of the present application are described above, so as to be understood by those skilled in the art, it should be understood that the application is not limited to the scope of the specific embodiments, and as long as various changes are made within the spirit and scope defined in the application, these changes will be apparent for those skilled in the art. All applications created by the use of present application concept are under the protection.

What is claimed is:

1. A method for skinning technology based on extended position based dynamics and for weight retargeting in character animation applied on a computer system, comprising the following steps:

step (1), according to an input triangular mesh, generating, by a processor of the computer system, a tetrahedral mesh corresponding to the triangular mesh, initializing a tensile constraint, a volume constraint, a self-collision constraint and an energy constraint of an extended position based dynamics (PBD) model for the tetrahedral mesh, and calculating and optimizing vertex weights of the triangular mesh and the tetrahedral mesh according to a corresponding skeleton model;

step (2), according to the vertex weights obtained in step (1), simultaneously calculating, by the processor of the computer system, transformed vertex positions of the triangular mesh and the tetrahedral mesh by using LBS (linear blend skinning) in a process of a skeletal movement to implement deformations of the triangular mesh and the tetrahedral mesh;

step (3), calculating by the processor of the computer system, the transformed vertex positions of the tetrahedral mesh through a constraint on the PBD defined by an iterative solution, and updating a deformation effect of the triangular mesh through a mapping relation between the tetrahedral mesh and the triangular mesh;

step (4), conducting, by the processor of the computer system, a Laplacian smoothing on a joint region of the triangular mesh, of which the deformation effect is currently updated in step (3), to obtain a real and natural triangular mesh deformation effect;

step (5), taking, by the processor of the computer system, the triangular mesh in step (1) as an original mesh, giving another triangular mesh having a mesh topology similar to that of the original mesh as a new mesh, calculating a bi-harmonic distance field of the original mesh and the new mesh, respectively, selecting a set of corresponding reference vertices between the original mesh and the new mesh, re-expressing all vertices on the original mesh in a form of distance vectors associated with vertices selected as the reference vertices on the original mesh, and defining a prediction function for weight retargeting calculation;

step (6), according to the bi-harmonic distance field obtained in step (5), for any vertex on a new mesh, obtaining, by the processor of the computer system through minimizing the prediction function, a corresponding vertex on the original mesh to complete a retargeting of the vertex weight from the original mesh to the new mesh.

2. The method for skinning technology based on extended position based dynamics and for weight retargeting in the character animation according to claim 1, wherein, in step (5), in order to reduce algorithm errors, multiple corresponding vertices are acquired for each vertex on the new mesh, and then a final weight is obtained through an interpolation method; on the premise that calculation is reduced and a smallest possible error is ensured, a number of the corresponding vertices to be acquired is 5.

3. The method for skinning technology based on extended position based dynamics and for weight retargeting in the character animation according to claim 1, wherein in step (1), the initializing a tensile constraint, a volume constraint, a self-collision constraint and an energy constraint of extended position based dynamics (PBD) model for the tetrahedral mesh is specifically:

defining an energy constraint for each small tetrahedral element in the tetrahedral mesh, wherein let $P_0$ be a center of gravity of the tetrahedral $P_1P_2P_3P_4$, then a formula is:

$$P_0 = \Sigma_{i=1}^{4} m_i P_i / \Sigma_{i=1}^{4} m_i \quad (1)$$

according to the Hooke's law, the energy constraint is defined as:

$$C_{energy}(P_1, P_2, P_3, P_4) = \frac{1}{2} \Sigma_{i=1}^{4} k_i (|P_i - P_0| - d_i)^2 \quad (2)$$

wherein $k_i$ is an elastic coefficient of a virtual spring $P_iP_0$, and $d_i$ is a static length of the spring.

4. The method for skinning technology based on extended position based dynamics and for weight retargeting in the character animation according to claim 1, wherein in step (2), optimizing mesh deformations using extended PBD is as follows:

at a skinning stage, firstly implementing the deformations of the triangular mesh and the tetrahedral mesh through the LBS, and a formula for a position transformation of a vertex on the mesh is as follows:

$$P' = \Sigma_{i=1}^{b} w_i B_i^{-1} W_i P \quad (3)$$

wherein b is a number of skeleton blocks, $w_i$ is an influence weight of an ith block of the skeleton on the vertex, and $\Sigma_{i=1}^{b} w_i = 1$, B is a constant, $W_i$ is a world matrix of the ith block of the skeleton;

using barycentric coordinates to implement a mapping between the triangular mesh and the tetrahedral mesh, a formula for a relation between each vertex P of the triangular mesh and four vertices $P_1$, $P_2$, $P_3$ and $P_4$ of the corresponding tetrahedral mesh is as follows:

$$P = \Sigma_{i=1}^{4} P_i w_i \quad (4)$$

wherein $w_i$ is a weight of vertex P corresponding to $P_i$.

5. The method for skinning technology based on extended position based dynamics and for weight retargeting in the character animation according to claim 1 wherein in step (5), a procedure of calculating the bi-harmonic distance field of the mesh is:

step 1, calculating a bi-harmonic distance field of a new mesh M and an original mesh N, respectively;

step 2, giving a set of corresponding vertices $(x_i, y_i) \in M \times N$, $i=1, \ldots, k$, wherein k is a number of pairs of the corresponding vertices;

step 3, representing any vertex $x \in M$ in distance vectors to a known corresponding vertex:

$$\overline{X} = \frac{1}{\max_i d(x, x_i)}(d(x, x_1), d(x, x_2), \ldots, d(x, x_k)) \quad (5)$$

accordingly, also representing any vertex y c N in:

$$\overline{Y} = \frac{1}{\max_i d(y, y_i)}(d(y, y_1), d(y, y_2), \ldots, d(y, y_k)) \quad (6)$$

step 4, defining a prediction function:

$$C(x,y) = |\overline{X} - \overline{Y}|_w = (\Sigma_{i=1}^{k} w_i(x)|d(x,x_i) - d(y,y_i)|^2)^{1/2} \quad (7)$$

for the given x, the y which lets the prediction function have the minimum value is x', which is the corresponding vertex of the x; in order to reduce errors, it is necessary to find another four vertices $y_1$, $y_2$, $y_3$, and $y_4$ for the x that make the prediction function value be relatively minimum, and obtain a final weight of the x through the interpolation method:

$$w_{x'} = \frac{\Sigma_{i=1}^{4} f_i(x') w_i}{\Sigma_{i=1}^{4} f_i(x')} \quad (8)$$

wherein w is a weight vector, $$f_i(x') = \frac{1}{d(y_i, x')}, d(.,.)$$

is a bi-harmonic distance between two vertices.

* * * * *